United States Patent [19]
Schmermund

[11] 3,933,568
[45] Jan. 20, 1976

[54] APPARATUS FOR MANUFACTURING A WRAPPER WEB PROVIDED WITH A TEAR-OPEN STRIP

[76] Inventor: Alfred Schmermund, 62 Kornerstrasse, 5820 Gevelsberg, Germany

[22] Filed: Oct. 3, 1973

[21] Appl. No.: 403,306

[30] Foreign Application Priority Data
Oct. 18, 1972  Germany............................ 2250932

[52] U.S. Cl. ................ 156/512; 156/554; 156/582; 156/583; 93/1 TS
[51] Int. Cl.² .................... B32B 31/20; B32B 35/00
[58] Field of Search .......... 156/512, 260, 264, 259, 156/554, 499, 582, 583; 93/1 TS

[56] References Cited
UNITED STATES PATENTS

| | | | |
|---|---|---|---|
| 1,794,674 | 3/1931 | Cumfer............................ | 156/512 |
| 3,410,745 | 11/1968 | Canepa............................ | 156/554 |
| 3,551,245 | 12/1970 | Gamberini..................... | 156/512 X |
| 3,566,752 | 3/1971 | Dreher............................ | 156/264 X |
| 3,607,573 | 9/1971 | Michaelides et al............ | 156/554 X |
| 3,798,110 | 3/1974 | Von Gunten................... | 156/583 X |

*Primary Examiner*—Douglas J. Drummond
*Assistant Examiner*—M. G. Wityshyn
*Attorney, Agent, or Firm*—Sughrue, Rothwell, Mion, Zinn & Macpeak

[57] ABSTRACT

Apparatus for manufacturing a wrapper web provided with a tear-open strip is disclosed. A web of wrapper material is fed along a generally planar guide path and two parallel incisions are made in the web to separate a narrow central strip of material therefrom. This narrow strip is raised out of the planar guide path, along which the two edge pieces on each side of the narrow strip continue to be fed. The two edge pieces are urged towards one another until mutually facing edges of the two edge pieces abut against one another below the centre of the narrow strip. The narrow strip is then guided back into the planar guide path so that it overlaps longitudinal edge portions of the two edge pieces, to which the narrow strip is adhesively or heat bonded to provide a web having a tear-off strip.

5 Claims, 11 Drawing Figures

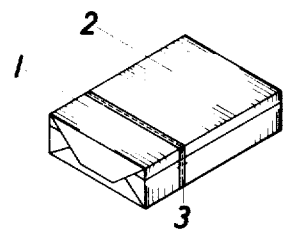
Fig.1
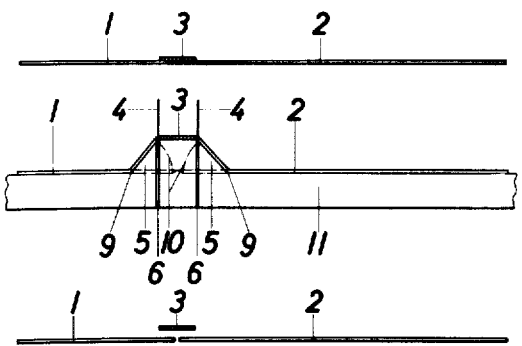
Fig.2
Fig.3
Fig.4
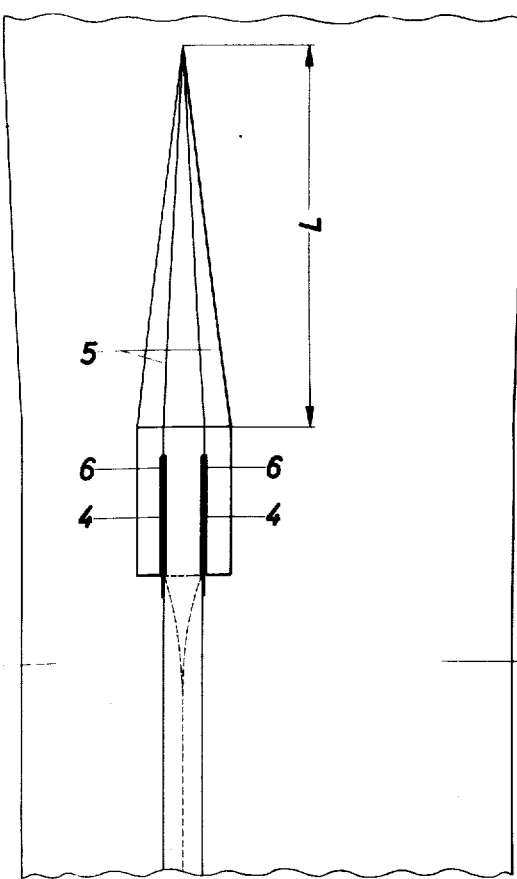
Fig.5

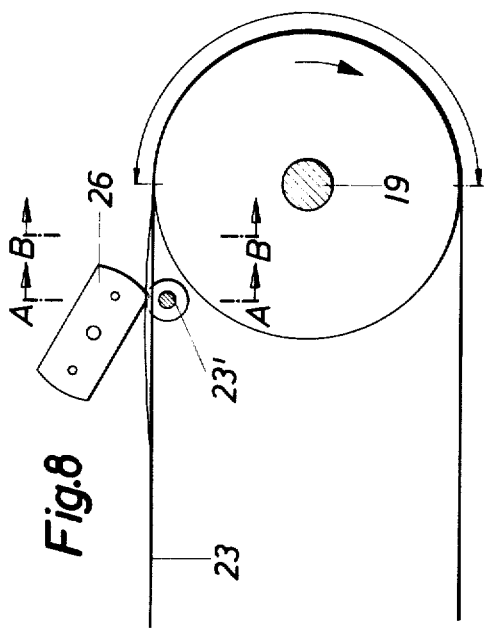
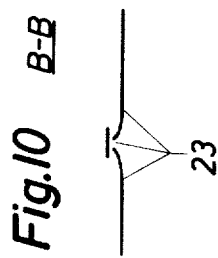
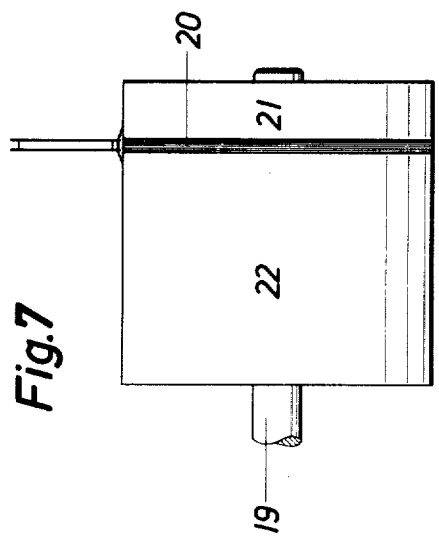
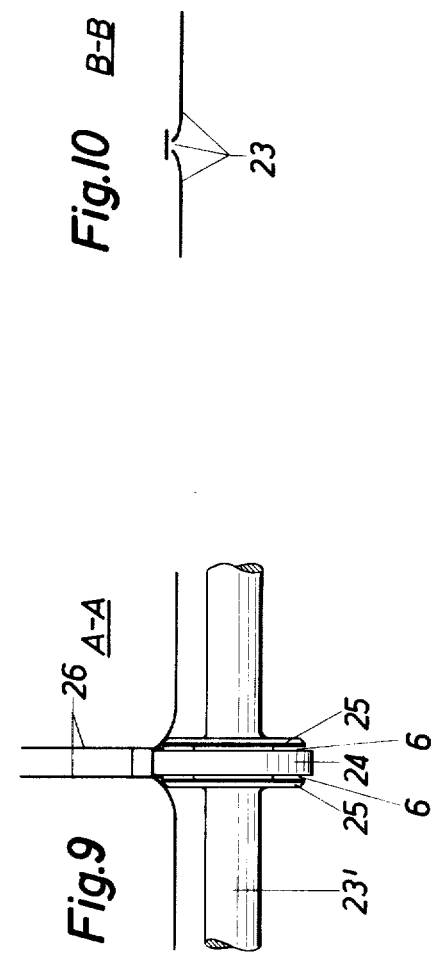

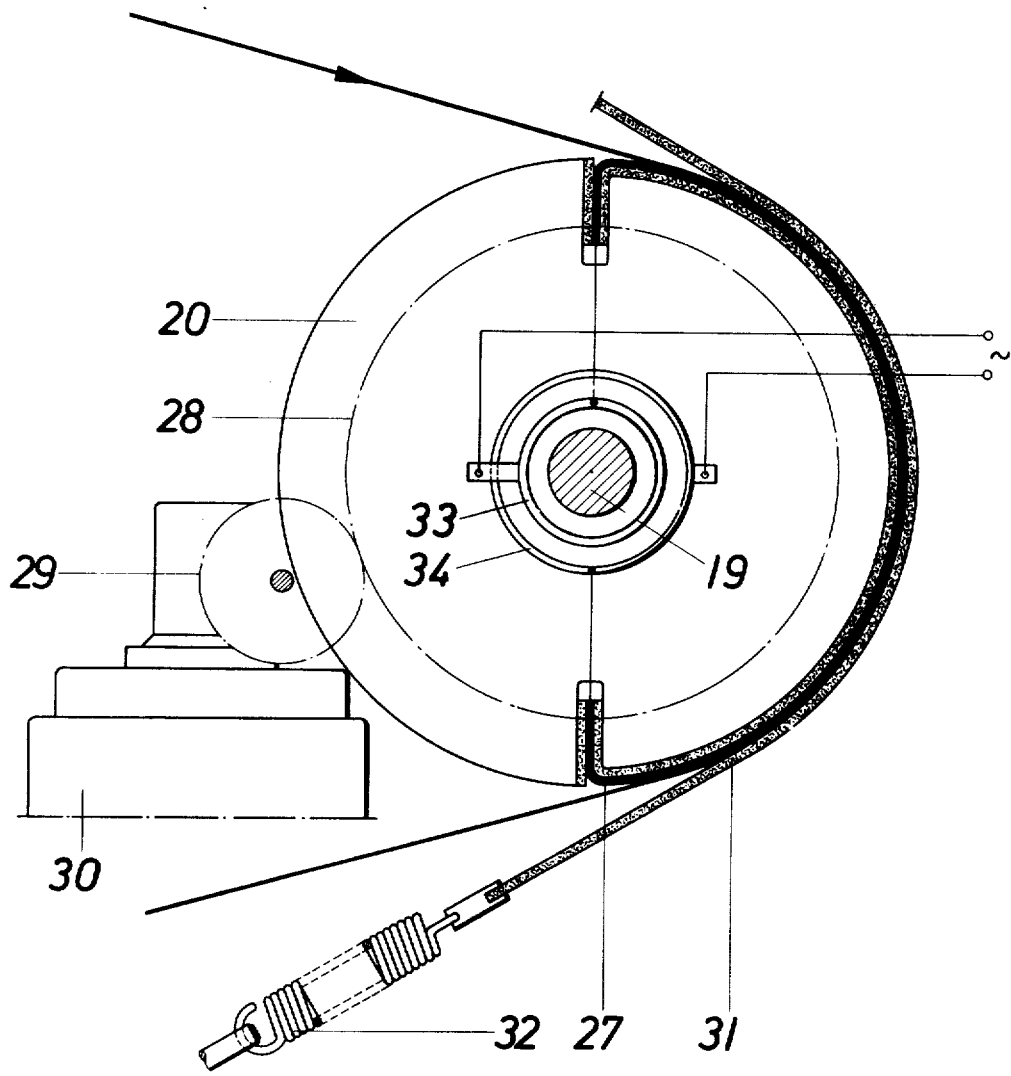
Fig. II

APPARATUS FOR MANUFACTURING A WRAPPER WEB PROVIDED WITH A TEAR-OPEN STRIP

The present invention relates to apparatus for manufacturing a wrapper web of viscose foil, or similar stickable or weldable wrapper material, provided with a tear-open strip.

It is known to provide apparatus for cutting a tear-open strip from one edge of a web of wrapping material whilst the web is guided in a generally planar guide path. The strip after being severed from the remainder of the web is then guided out of the general plane of the web feed path and displaced laterally to overlie the remainder of the web. The strip is then heat welded to the remainder of the web to provide a tear-open strip. However, the resulting web is dependent on the effectiveness of the bond between the strip and the remainder web to effect actual tearing of the material of the remainder web, when the tear-open strip is torn off, if a package wrapped in a web provided with tear-off strip of such known construction is to be opened effectively.

According to the present invention there is provided apparatus to manufacture a wrapper web provided with a tear-open strip, the apparatus comprising feeder means to feed a web of wrapper material in a given direction along a first path including a planar portion, cutter means comprising two cutter elements disposed at a predetermined spacing apart in a direction perpendicular to said given direction and adapted to make mutually parallel longitudinally extending incisions in said web of wrapper material to sever therefrom a strip having its width defined by said predetermined spacing and on each of mutually opposite side of said incisions to leave a respective web piece having a width substantially greater than that of said strip, first guide means to displace said strip out of the plane of said planar portion of said first path and to guide said strip along a second path, said second path being convergent with said planar portion of said first path downstream of said first guide means, second guide means having respective guide elements spaced apart in a direction perpendicular to said given direction at a distance substantially equal to the sum of the respective widths of said web pieces, said guide elements being operatively associated with said planar portion of said first path downstream of said first guide means to guide said web pieces into mutually abutting edge-to-edge relationship, third guide means operatively associated with said planar portion of said first path downstream of said first guide means to guide said strip into overlapping relationship with longitudinally extending and mutually next adjacent edge portions of each of said web pieces in said planar portion of said first path, and connector means to connect said strip — when in said overlapping relationship — to each of said edge portions.

BRIEF DESCRIPTION OF THE DRAWINGS

Embodiments of the invention will now be more particularly described with reference to the accompanying drawings, in which:

FIG. 1 shows a perspective view of a package wrapped in a wrapper web provided with a tear-open strip;

FIG. 2 shows a cross-sectional view of a wrapper web provided with a tear-open strip;

FIG. 3 shows a cross-sectional view of part of apparatus for manufacturing a wrapper web provided with a tear-open strip;

FIG. 4 shows the relative positions of the web portions of the wrapper strip after carrying out separating cuts;

FIG. 5 shows a plan view of the apparatus shown in FIG. 3;

FIG. 7 shows an elevational view of a guide roller assembly;

FIG. 8 shows another view of the guide roller assembly shown in FIG. 7 together with other components of apparatus embodying the invention;

FIG. 9 shows a section along the line A—A in FIG. 8;

FIG. 10 shows a section along the line B—B in FIG. 8; and

FIG. 11 shows on an enlarged scale and in greater detail part of the apparatus shown in FIG. 8.

DESCRIPTION OF THE PREFERRED EMBODIMENTS

Figure 6:
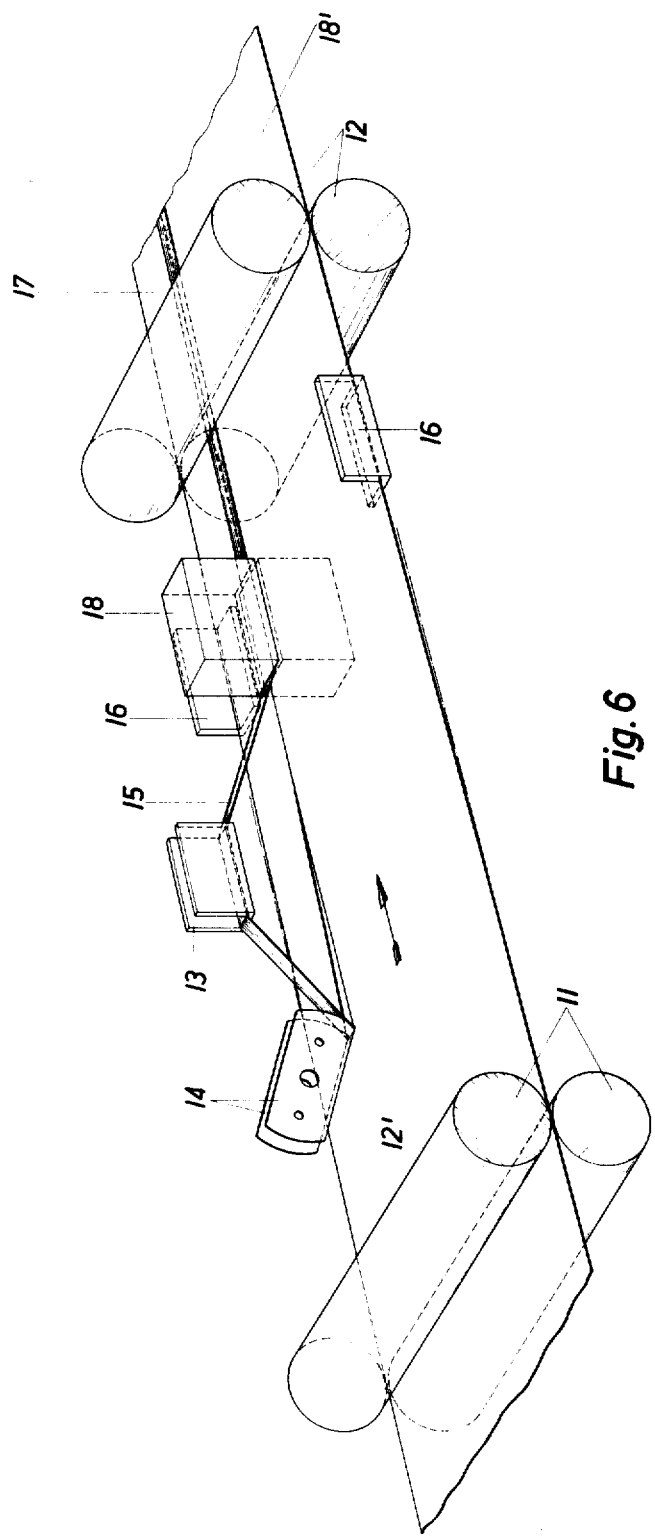
FIG. 6 shows a schematic representation of apparatus embodying the invention.

A wrapper web shown in FIGS. 1 and 2 comprises two web pieces 1 and 2, which extend parallel to one another and abut one another along a longitudinal butt joint. This longitudinal butt joint is covered over by a strip 3 of the same material as that of the web pieces 1 and 2. The strip 3 serves as a tear-open strip. The strip 3 is welded or adhesively bonded to the web pieces 1 and 2.

Apparatus for the manufacture of a wrapper web provided with a tear-open strip is shown in FIGS. 3 and 5. The apparatus comprises a runway table 11, on which protruding means in the form of a guide profile 5 having a trapezium-shaped cross-section — when viewed perpendicularly to the direction of web feed — is disposed. At the longitudinal edge of this guide profile 5 are provided slots 6, which serve for the reception of incising means, for example, a pair of mutually spaced parallel razor blades. A cross-sectional view of the guide profile 5 is shown on an enlarged scale in FIG. 3. The length of the inclined sides of the regular trapezium is substantially equal to the total length of the base side, so that the incised edges of the web pieces 1 and 2 lying upon the inclined side surfaces of the guide profile 5 can fold down along the circular arcs 10 and abut against one another in a longitudinal butt seam.

Due to the guide profile 5, which tapers down in wedge shape over the length L, there ensues a bulging-out of the middle portion of the uncut web material 7 in the illustrated manner to be trapezium-shaped. Severing knife blades 4 sever the web 7 into two web pieces 1 and 2 and a strip 3. It will be appreciated that the width of the strip 3 is substantially equal to the distance separating the two knife blades 4. After the web pieces 1 and 2 have been guided out beyond the protruding guide profile, the domed-out edge portions of the web fold toward one another and lie against one another in longitudinal abutting relationship to define a butt seam. The strip 3 is laid over the butt seam and is welded or adhesively bonded to the longitudinally extending edge portions of the web pieces 1 and 2 which are overlapped by the strip 3.

The apparatus shown in FIG. 6 comprises a pair of first transport rollers 11 and a pair of further transport rollers 12, between which a web of material 12' is displaced in the direction indicated by the double-tailed arrow. The guide profile 5 of FIG. 5 is disposed in the web feed path between the rollers 11 and 12 in FIG. 6 although, in the interests of clarity of illustration, the guide profile 5 has not been shown in FIG. 6. As has been described with reference to FIG. 5, the guide profile 5 is provided with two slots 6 for the reception of respective razor blades 14 which, as shown in FIG. 6, cut a strip 15 from the web material 12' as the latter is fed in the direction indicated in FIG. 6 by the double-tailed arrow. The strip 15 is guided by first guide means, which comprises the guide profile 5 of FIG. 5 and a bracket member 13, along a second guide path which is convergent with the planar portion of the first guide path downstream of the first guide means.

Thus, as shown in FIG. 6, the strip 15 is guided through a substantially U-shaped channel defined by the bracket member 13. Second guide means in the form of two lateral guide elements 16 are arranged downstream of the guide bracket 13 to urge the web pieces 17 and 18' towards one another so that the longitudinally extending and mutually facing edges thereof are disposed in substantially abutting relationship. As shown in FIG. 6, the guide elements 16 are spaced apart in a direction perpendicular to the given direction of web feed by a distance which is substantially equal to the sum of the respective widths of the web pieces 17 and 18'. As shown in FIG. 6, the strip 15 is guided into overlapping relationship with longitudinally extending and mutually next adjacent edge portions of each of the web pieces 17 and 18' by third guide means formed by the housing of a heater device 18. The heater device 18 is provided with heater elements arranged above and below the web material. The heater device 18 is schematically represented in FIG. 6 and is aligned with a seam, which is formed by the abutting longitudinally extending edge portions of the web pieces 17 and 18', and with the strip 15.

The application of heat to the strip 15 and to the abutting edge portions of the pieces 17 and 18' causes the edge portions to be welded to the strip 15.

The apparatus shown in FIGS. 7 to 10 includes a shaft 19 on which a guide roller disc section 20 is mounted to rotate therewith. Guide rollers 21 and 22 are journalled to be freely rotatable on the shaft 19 and are disposed on each side of the roller disc section 20. A web of material 23 is guided over the guide rollers 21 and 22 and, as shown in FIG. 8 extends over an arc of contact of 180° with the guide roller assembly 20, 21 and 22. On the input side, the web of material runs over means protruding from the general plane of the web 23. The protruding means comprises a profile roller assembly, which includes a central roller guide disc 24 corresponding in width to that of the tear-open strip and two profiled edged discs 25 disposed on opposite sides of the disc 24. The central roller 24 and the two profiled edged rollers 25 are supported on a shaft 23', which extends perpendicularly to the web feed direction and is rotatably mounted. As indicated on an enlarged scale in FIG. 9, a portion of the web 23 is raised out of its general plane as it passes over the rollers 24 and 25, and the raised portion of the web 23 is of smaller shape in cross-section to the outwardly bulging portion of the web 7 shown in FIG. 5. Aligned with the edges of the guide disc 24 are knife blades 26, which separate a tear-open strip from the web of material. FIG. 10 shows the conditions which obtain after the severing of this tear-open strip. The longitudinal edges of the two web pieces remaining on each side of the tear-open strip fold together and lie against one another. The next adjacent longitudinal edge portions of these web pieces are covered over by the tear-open strip, which runs over the disc 20 (FIG. 7). This disc 20 is at least over the 180° of the arc of contact, over which the web of material runs, provided with an elongate ribbon electrical heater element, so that a heat sealing of the tear-off strip and the edge portions of the web pieces takes place.

FIG. 11 shows on an enlarged scale the construction of the disc 20 shown in FIG. 7. As shown in FIG. 11, the disc 20 is provided with a heater tape 27 extending over 180° of the arc of contact. This heater tape 27 is electrically conductive and an electrical current is passed through the tape 27 in order to apply heat to the tear-open strip and to the longitudinal edge portions of the web pieces disposed beneath it. The electrical current supply circuit for the tape 27 is derived from an electrical current source — indicated symbolically in FIG. 11 and electrically connected to the tape 27 via split-rings mounted on the shaft 19. The means for connecting the tape 27 to the electrical current source may be of a kind well known to those skilled in the art and therefore will not be further described in detail. The disc 20 is rotatably driven by an electric motor 30 coupled to a drive wheel 29 which meshes with a spur wheel 28, the latter being rigidly mounted on the shaft 19. A tape 31 of thermal insulating material having a tensioning device 32 overlaps the heated arc of contact of the disc 20, so as to reduce wastage of heat and to enable the heating load to be kept as small as possible. FIG. 11 shows the operative position of the disc 20 on the shaft 19. When the machine for any reason must be stopped, then the disc 20 is angularly displaced through 180° with the aid of the motor 30, so that the web of material on the arc of contact is no longer heated in order to avoid overheating of the web of material on the arc of contact.

In the embodiments which have been described above the incised edges of the web pieces 1 and 2 are located in abutting relationship when overlapped by and connected to the tear-open strip 3.

I claim:

1. Apparatus to manufacture a wrapper web provided with a tear-open strip, the apparatus comprising, in combination:
   feeder means to feed a web of wrapper material in a given direction along a first path including a planar portion;
   cutter means comprising two cutter elements disposed at a predetermined spacing apart in a direction perpendicular to said given direction and adapted to make mutually parallel longitudinally extending incisions in said web of wrapper material to sever therefrom a strip having its width defined by said predetermined spacing and on each of mutually opposite sides of said incisions to leave a respective web piece having a width substantially greater than that of said strip;
   first guide means comprising means protruding from said planar portion of said first path to define a ramp surface extending from and inclined at an acute angle with respect to said planar portion to cause a portion of said web traversing said protruding means to be guided along said ramp surface and out of the plane of said planar portion of said first path and to guide said strip along a second path, said second path being convergent with said planar portion of said first path downstream of said first guide means, said cutting means co-operating with said protruding means to make said incisions in said web;

second guide means having respective guide elements spaced apart in a direction perpendicular to said given direction at a distance substantially equal to the sum of the respective widths of said web pieces, said guide elements being operatively associated with said planar portion of said first path downstream of said first guide means to guide said web pieces into mutually abutting edge-to-edge relationship;

third guide means operatively associated with said planar portion of said first path downstream of said first guide means to guide said strip into overlapping relationship with longitudinally extending and mutually next adjacent edge portions of each of said web pieces in said planar portion of said first path; and connector means to connect said strip — when in said overlapping relationship — to each of said edge portions.

2. Apparatus as defined in claim 1, wherein said protruding means comprises a fixed generally wedge-shaped guide profile tapering outwardly in said given direction of feed of said web and provided with two slots each extending longitudinally of said first path, each of said cutter elements being mounted to enter a respective one of said slots.

3. Apparatus as defined in claim 1, wherein said protruding means comprises a roller assembly mounted to rotate about an axis of rotation extending substantially perpendicularly of said given direction of feed of said web and to have a portion of the periphery thereof protruding from said plane, said roller assembly comprising a central roller having a width substantially equal to said predetermined spacing, and a respective disc member rotatable with and mounted on each side of said central roller, each said disc member being spaced apart from said central roller to define therebetween a groove into which a respective one of said cutter elements enters.

4. Apparatus as defined in claim 1, wherein said third guide means comprises a guide roller assembly mounted on a shaft extending substantially perpendicularly of said given direction of feed of said web, and an elongate ribbon element of thermally insulating material, said guide roller assembly comprising a roller section rigidly connected to said shaft, a respective guide roller disposed next adjacent each end portion of said roller section and each mounted to rotate freely on said shaft, and selectably operable drive means to rotatably displace said roller section through substantially 180°, said roller section having a width substantially equal to said predetermined spacing and being disposed in substantial aligned relationship with said first guide means, and wherein said connector means comprises an elongate ribbon electrical heater element extending around a portion of said periphery of said roller section to subtend an angle of substantially 180° at the centre of said roller section, said web pieces with said strip in said overlapping relationship being guided between said guide roller assembly and said elongate ribbon element of thermally insulating material to permit said heater to apply heat to weld said strip to said edge portions of said web pieces, and said roller section being rotatably displaceable to cause said heater element to be selectably removed from contact with said wrapper web.

5. Apparatus as claimed in claim 1, wherein said protruding means in cross-section perpendicular to said given direction of feed of said web defines a substantially trapezoidal profile.

* * * * *